United States Patent [19]
Parks et al.

[11] Patent Number: 5,455,466
[45] Date of Patent: Oct. 3, 1995

[54] INDUCTIVE COUPLING SYSTEM FOR POWER AND DATA TRANSFER

[75] Inventors: Terry J. Parks, Round Rock; David S. Register, Austin, both of Tex.

[73] Assignee: Dell USA, L.P., Austin, Tex.

[21] Appl. No.: 98,683

[22] Filed: Jul. 29, 1993

[51] Int. Cl.⁶ .................................................... H04Q 1/18
[52] U.S. Cl. ................ 307/104; 340/825.31; 340/825.34
[58] Field of Search ............................ 307/104; 336/226, 336/184, 200, 117, 119–129; 323/308, 331; 340/825.31, 825.34, 825.55, 825.72

[56] References Cited

U.S. PATENT DOCUMENTS

| | | | |
|---|---|---|---|
| 4,800,328 | 1/1989 | Bolger | 320/2 |
| 4,818,855 | 4/1989 | Mongeon et al. | 235/440 |
| 4,918,432 | 4/1990 | Pauley et al. | 340/573 |
| 5,041,826 | 8/1991 | Milheiser | 340/825.54 |
| 5,229,652 | 7/1993 | Hough | 307/104 |
| 5,257,011 | 9/1993 | Beigel | 340/572 |

*Primary Examiner*—Peter S. Wong
*Assistant Examiner*—Aditya Krishnan
*Attorney, Agent, or Firm*—David McCombs; James Huffman; David Hitt

[57] ABSTRACT

A system for inductively coupling power and data to a portable electronic device. A portable device, such as a personal digital assistant, is powered or recharged via an inductive link between the device and a support unit, thereby eliminating the need for cabling or other connections therebetween. The same inductive link is also used to transfer data signals between the device and a second electronic device, for example, a conventional desktop computer. The support unit includes a primary winding of a transformer, a power amplifier and a modulator. The portable device includes a secondary winding connected in parallel with the input of a rectifier, the output of which is connected to a battery charging circuit, and to a modem, which is further connected to the device microprocessor. Placement of the device on the support unit effects the inductive coupling when the primary and secondary windings are in proximity to one another.

17 Claims, 2 Drawing Sheets

INDUCTIVE COUPLING SYSTEM FOR POWER AND DATA TRANSFER

TECHNICAL FIELD

The invention relates generally to portable electronic devices and particularly to a system for inductively coupling such devices to a power source or to another device for transfer of data.

BACKGROUND OF THE INVENTION

For portability, many electronic devices are designed to operate on batteries as a remote power source. Examples of such devices include personal digital assistants (PDAs) and portable personal computers (PCs). Users generally prefer rechargeable batteries, such as nickel cadmium (NiCd) batteries, rather than regular alkaline batteries, as NiCd batteries are capable of being recharged many times and are therefore more economical than their alkaline counterparts, which must be replaced and discarded when they have been depleted.

As a result of this preference for rechargeable batteries, many portable devices are equipped with a battery charger to allow periodic recharging of the batteries from an alternating current (AC) power source, such as a standard AC outlet. Further, such devices often include an AC adapter so that during long periods of stationary use, battery potential can be conserved by operating the device directly from an AC power source. Electric wiring in the form of detachable cable is utilized to selectively connect the charger or AC adapter to the power source. In some instances, multiple sections of cable must be manipulated to properly connect the various components with the power source.

Portable devices are also periodically connected to other devices for the purpose of data transfer. For example, it may be desirable to communicate data between a portable PDA and a desktop PC in order update the information stored in each device or to download information from one device to the other. Detachable cabling is utilized to interconnect these devices at their respective communications ports.

There are many inconveniences associated with the use of detachable cabling to connect portable devices to a power source or to another device for data transfer. Cables are cumbersome and easily become disassociated from the device when needed, or lost altogether. They often get tangled, both with the device and with one another. Cables may be attached incorrectly or become detached unintentionally. Further, cables become worn or broken with frequent use resulting in poor connections. Accordingly, any reduction in the amount of cabling necessary to transfer power or data to a portable device would greatly enhance the utility thereof.

Other conventional arrangements for removably connecting electronic devices to a signal or power source include mechanical interfaces for the relative positioning of electrically conductive plates, tabs or similar members, such as found in base units or receptacles used with portable telephones and other equipment. However, all such arrangements relying on mechanical connections possess disadvantages similar to those described above with respect to cabling, and are therefore undesirable in many respects.

Therefore, what is needed is a system by which a portable device may be removably connected to a power source or to another device for data transfer, without employing detachable cables or other mechanical contact arrangements.

SUMMARY OF THE INVENTION

The foregoing problems are solved and a technical advance is achieved by a system for inductively coupling power and data to a portable electronic device. In a departure from the art, a portable electronic device, such as a personal digital assistant, is powered or recharged via an inductive link between the portable device and a signal source, thereby eliminating the need for a mechanical connection therebetween. The same inductive link used to transfer power is also used to transfer data signals between the device and a second electronic device, for example, a conventional desktop computer.

In one embodiment, the system comprises a portable electronic device, having at least one rechargeable battery and an appropriate battery charging circuit connected thereto, and a support unit upon which the portable device is placed during battery charging or data communication operations. Placing the device in proximity to the support unit inductively couples them so that no cabling or mechanical connections are necessary. The support unit includes a primary winding of a transformer, a power amplifier and a modulator. The power amplifier derives power from an AC power source, such as an AC outlet, via a power cord. The modulator is connected to a communications port of a second electronic device, for example, a computer, via an appropriate data transmission line, and to an input of the power amplifier. Signals from the second electronic device are modulated by the modulator and then input to the power amplifier. The power amplifier amplifies the received power or data signals and then outputs them to the primary winding, for inductive transfer to the portable device.

The portable device includes a secondary winding connected in parallel with the input of a full wave bridge rectifier, the output of which is connected to the battery charging circuit, and to a modem, which is further connected to a microprocessor. When the portable device is positioned in proximity to the support unit such that the primary and secondary windings are inductively coupled, the amplified signals in the primary winding induce corresponding signals of the same frequency in the secondary winding. The rectifier circuit rectifies the induced signals to a level of direct current (DC) appropriate for charging the battery and outputs the rectified signal to the charging circuit. The modem demodulates the induced signals and outputs the demodulated signals to the microprocessor of the portable device for processing thereby.

The signals induced in the secondary winding may alternatively be used as a direct source of operating power for the portable device. Rather than being applied to the battery charging circuit, as described above, the induced signals are input, via the rectifier, to a sink of electrical power, which sink may then be used as a source of operating power for the portable device.

In an alternative embodiment, two-way inductively coupled data communication is enabled by providing a demodulator connected in parallel with the primary winding within the support unit. Signals output the microprocessor are modulated by the modem and applied to the secondary winding. The corresponding signals induced in the primary winding are demodulated by the demodulator and then input to the second electronic device for processing thereby.

A technical advantage achieved with the invention is the elimination of the need to physically cable a portable electronic device to an AC power source in order to power the device or recharge its batteries.

Another technical advantage achieved is the elimination of the need to physically cable of a portable electronic device to another device for data communication therebetween. For computer applications, this enables automatic data transfer between a portable device such as a PDA and a desktop computer, by resting the PDA on the support unit connected to the computer. Applications residing on both the PDA and the computer may thus be automatically updated to contain the same information.

A further technical advantage achieved is that the portable device may be made completely sealed, and thus waterproof, since no direct electrical contacts are necessary for data or power transfer.

DETAILED DESCRIPTION OF PREFERRED EMBODIMENT

Figure 1:
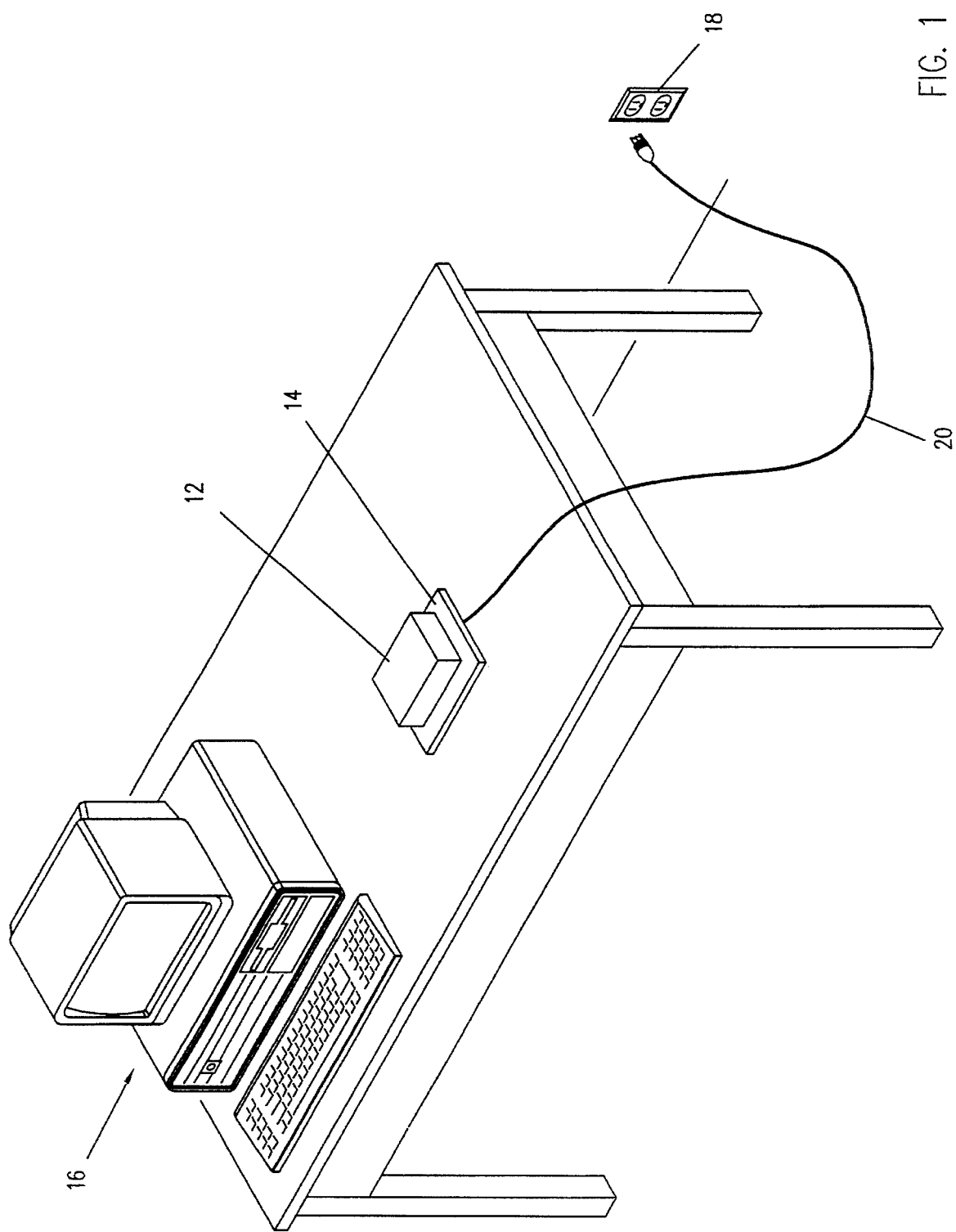
FIG. 1 is a front elevation view of an inductively coupled battery charger and data communication system embodying features of the present invention.
Figure 2:
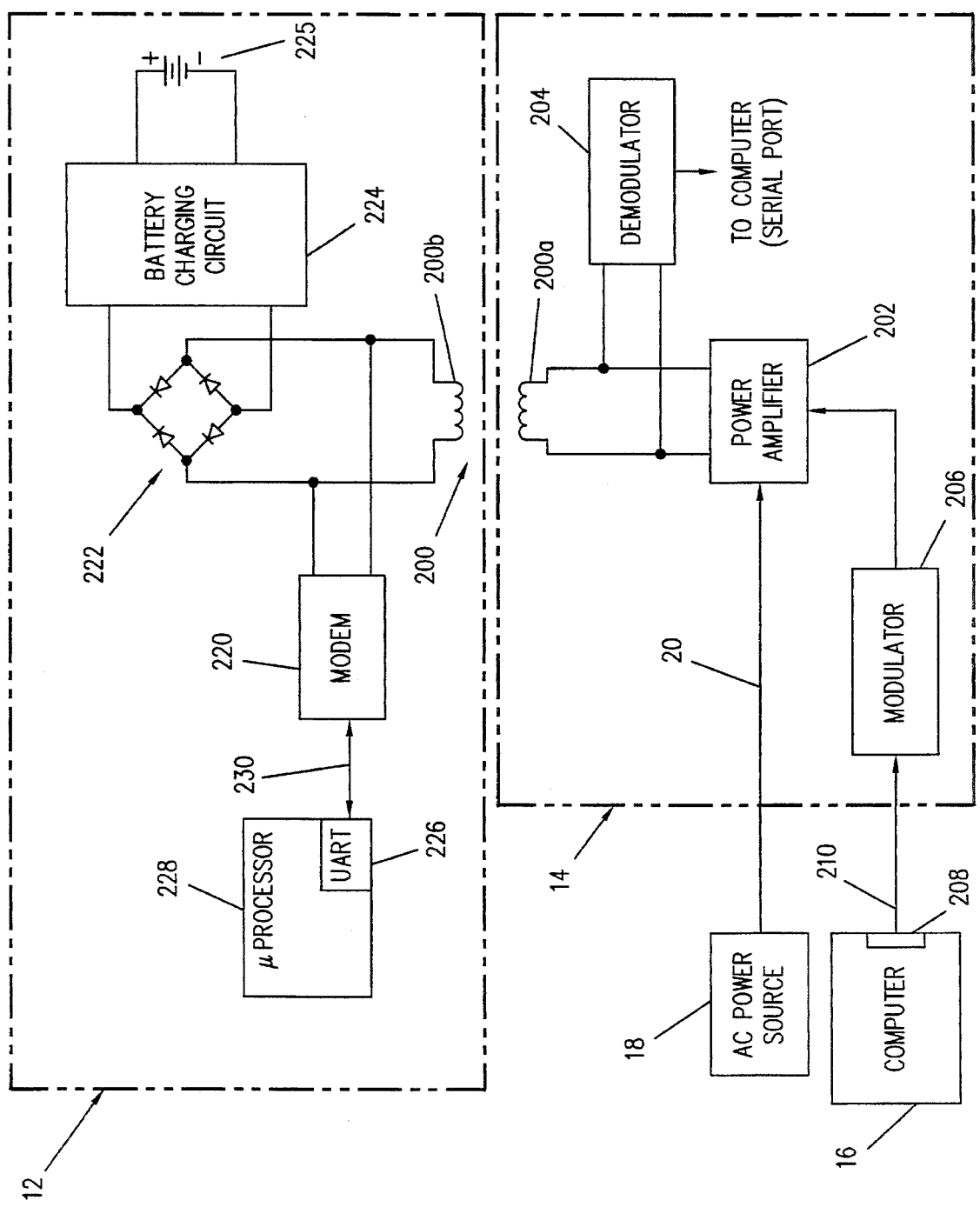
FIG. 2 is a block diagram of the system of FIG. 1.

In FIG. 1, the reference numeral 10 designates an inductive coupling system for power and data transfer embodying features of the present invention. The system 10 comprises a portable electronic device 12, such as a personal digital assistant (PDA), which is placed on a support unit 14 for inductive coupling therebetween, as will be described in detail below. The unit 14 is placed near a power source 16, preferably an AC outlet. A power line 18 connects the unit 14 to the source 16. A desktop computer 20 is placed near the unit 14 and is connected to the unit with a standard communication line (FIG. 2). As illustrated, the unit 14 preferably is embedded in the surface of a desk 22, although other configurations are also contemplated. Although not shown, the support unit 14 may include a cradle or recess for receiving the device 12 in a selected orientation for proper inductive coupling.

FIG. 2 schematically illustrates the components of the system 10. Disposed within the unit 14 is a primary winding 200a of a transformer 200. A secondary winding 200b of the transformer 200 is disposed within the device 12. The primary winding 200a is connected in parallel to a power amplifier 202 and a demodulator 204. The amplifier 202 derives operating power from power source 16 via the power line 18. A modulator 206 is connected to a serial port 208 of the computer 20 via a data transmission line 210 for modulating digital signals output by the computer 20 at the port 208. It should be understood by those skilled in the art that frequency, phase or amplitude modulation of the signals may be used, depending on the power transfer rate and bit rate desired. The modulated data signals output by the modulator 206 are input to the power amplifier 202, which amplifies the signals to a level sufficient for data communication or for charging the device 12 before outputting them to the primary winding 200a.

A modem 220 and the input of a full-wave bridge rectifier circuit 222 are connected in parallel with the secondary winding 200b, within the device 12. A battery charging circuit 224 is connected to the output of the full-wave bridge rectifier circuit 222. The charging circuit 224 comprises conventional circuitry and components necessary for recharging a battery 225 of the device 12. Although not shown, it is understood that the rectifier 222 may also be coupled to a sink of electric power disposed within the device 12. The sink may thus be used instead of the battery 225 for supplying operating power to the device 12.

The modem 220 is connected to a universal asynchronous transmitter and receiver (UART) 226 of a microprocessor 228 via a data transmission line 230. While not shown, it is understood that the device 12 has input/output facilities such as user keys and a display, and memory for storing user applications, all connected in a conventional manner to the microprocessor 228.

In operation, the support unit 14 is electrically coupled to the AC power source 16 and to the port 208 of the computer 20 via the line 18 and the line 210, respectively. The device 12 is placed on the support unit 14 such that the primary and secondary windings 200a, 200b of the transformer 200 are properly aligned and thereby inductively coupled. As previously described, proper positioning of the device 12 in relation to the support unit 14 may be facilitated by providing on the unit 14 some arrangement for receiving and holding the device 12. Power from the AC power source 16 is supplied to the power amplifier 202 through the line 18. Data signals output from the computer 20 on the line 210 are modulated by the modulator 206 and then amplified by the amplifier 202. The amplified signals are output by the amplifier 202 to the primary winding 200a.

Due to the inductive coupling between the windings 200a, 200b, the signals in the primary winding 200a induce corresponding signals of identical frequency in the secondary winding 200b. The signals induced in the secondary winding 200b are demodulated by the modem 220 and then are input to the microprocessor 228, via the UART 226, for processing. The induced signals are also input to the rectifier 222 to be rectified thereby before being input to the charging circuit 224 for recharging the battery 225.

The system 10 also operates to transfer data from the device 12 to the computer 16 by inductive coupling through the support 14. Signals output from the microprocessor 228 are transmitted to the modem 220 via the UART 226 and the line 230. The modem 220 modulates the data signals and outputs the modulated signals to the secondary winding 200b. When the portable device 12 is properly positioned on the support unit 14 such that the windings 200a, 200b are inductively coupled, as described above, signals having the same frequency as the signals in the secondary winding 200b will be induced in the primary winding 200a. The induced signals are demodulated by the demodulator 204 and input to the computer 16 via the line 210 and the serial port 208.

It should be understood that the modulation/demodulation performed by the modem 220, the modulator 206 and the demodulator 204 may be phase, frequency or amplitude modulation/demodulation, depending upon a variety of factors which are well known to those skilled in the art and will not be further addressed herein.

In the above manner, it is possible to transfer power inductively to charge the batteries of the device 12 or to operate the device 12 without the use of batteries. It is also possible to inductively transmit data between the device 12 and the computer 20. The inductive coupling eliminates the use of physical cables to connect the device 12 to the AC power source 16 or to the computer 20. Hence, the device 12 may be completely sealed to prevent damage from water or dirt.

The foregoing inductive coupling capability has special utility in the transfer of data between a PDA and a desktop computer. In some circumstances, information entered and stored in a PDA periodically must also be entered and stored in the same user's desktop computer, and vice-versa. Maintenance of calendar and address databases residing both devices is a relevant example. The system 10 can perform these functions automatically when the PDA is placed on the unit 14 when not in use.

It is understood that the present invention can take many forms and embodiments. The embodiments shown herein are intended to illustrate rather than to limit the invention, it being appreciated that variations may be made without departing from the spirit or the scope of the invention. For example, rather than being embedded in the desk 22, the support unit 14 may comprise a relatively flat plate or alternatively a holster apparatus configured to receive and hold the device 12 in the appropriate position. The portable device 12 may be any type of data processing device or other electronic product. In addition, the computer 20 may be a conventional desk top PC, a portable PC, a PDA, a data processor, a memory storage device or other data device.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. Apparatus for inductively coupling power and data to a portable electronic device, comprising:
   a first circuit connected to a data source for receiving data signals and connected to a power source for receiving power to amplify said received data signals;
   a second circuit connected to said portable electronic device, said first circuit inducing in said second circuit said received data signals when said second circuit is placed in proximity to said first circuit;
   a circuit connected to said second circuit for demodulating said induced signals, thereby providing data to said device;
   a circuit connected to said second circuit for rectifying said induced signals, thereby providing power to said device and;
   a battery charging circuit connected to said rectifier circuit for charging batteries used to power said device.

2. The apparatus of claim 1 wherein said first circuit comprises:
   a first inductive winding; and
   a power amplifier connected to said power source for amplifying said received data signals.

3. The apparatus of claim 1 wherein said second circuit comprises a second inductive winding.

4. The apparatus of claim 1 further comprising a modulator connected to said first circuit for modulating said received data signals.

5. The apparatus of claim 4 wherein said modulator delivers modulated signals by one of either frequency, amplitude or phase, according to the value of said received data signals.

6. The apparatus of claim 1 further comprising a sink of electrical power connected to said rectifier circuit for supplying operating power to said device.

7. The apparatus of claim 1 wherein said device comprises a personal digital assistant.

8. The apparatus of claim 1 wherein said data source comprises a personal computer.

9. Apparatus for inductively coupling power and data to a portable electronic device, comprising:
   a first circuit connected to a data source for transferring data signals and connected to a power source for receiving power to amplify said transferred data signals;
   a second circuit connected to said device, said first circuit inducing in said second circuit said data signals transferred from said data source when said second circuit is placed in proximity to said first circuit;
   a demodulator connected to said second circuit for demodulating said signals induced in said second circuit, thereby providing data to said device;
   a rectifier connected to said second circuit for rectifying said signals induced in said second circuit, thereby providing power to said device;
   a modulator connected to said second circuit for modulating data signals transferred from said device, said modulated data signals being induced in said first circuit when said second circuit is placed in proximity to said first circuit;
   a demodulator connected to said first circuit for demodulating said data signals induced in said first circuit for transfer to said data source; and
   a battery charging circuit connected to said rectifier for charging batteries used to power said device.

10. The apparatus of claim 9 wherein said first circuit comprises:
    a first inductive winding; and
    a power amplifier connected to said power source for amplifying said data signals transferred from said data source.

11. Apparatus for inductively coupling power to a portable data processing device, comprising:
    a first circuit connected to a power source for receiving power signals;
    a second circuit connected to said device for inducing in said second circuit said received power signals when said second circuit is placed in proximity to said first circuit;
    a rectifier connected to said second circuit for rectifying said power signals induced in said second circuit; and
    a battery charging circuit connected to said rectifier and connected to said device batteries for charging said batteries from said rectified power signals.

12. The apparatus of claim 11 wherein said first and second circuits respectively comprise first and second inductive windings.

13. Apparatus for inductively coupling data to a portable data processing device, comprising:
    a first circuit for transferring data signals, said first circuit connected to a data source;
    a second circuit for transferring data signals, said second circuit connected to said device;
    said first circuit inducing in said second circuit data signals being transferred from said source when said second circuit is placed in proximity to said first circuit;
    said second circuit inducing in said first circuit data signals being transferred from said device when said second circuit is placed in proximity to said first circuit;
    modem circuitry connected to said first circuit for modulating data signals received by said first circuit from said source and for demodulating data signals induced in said first circuit for transfer to said source;

modem circuitry connected to said second circuit for modulating data signals received by said second circuit from said device and for demodulating data signals induced in said second circuit for transfer to said device;

rectifier circuitry connected to said second circuit for rectifying said power signals induced in said second circuit; and a battery charging circuit connected to said rectifier circuitry for charging batteries used to power said device.

14. The apparatus of claim 13 further comprising a support for containing said first circuit.

15. The apparatus of claim 14 wherein said support defines a recess for receiving and holding said portable device in said first position.

16. Apparatus for inductively coupling data and power to a battery-powered, portable electronic device having a microprocessor, the apparatus comprising:

a first inductive winding disposed in a support unit;

a power amplifier connected to said first inductive winding and to a power source for amplifying signals input to said amplifier;

a modulator connected between a second electronic device and said power amplifier for modulating signals output by said second electronic device and inputting said modulated signals to said power amplifier;

a second inductive winding disposed in said portable device, said second inductive winding inductively coupled to said first inductive winding, such that signals in said first inductive winding induce signals in said second winding, when said portable device is in a proximal position relative to said support unit;

a rectifier circuit connected to said second inductive winding for rectifying signals induced in said second inductive winding, thereby providing power for said device;

a battery charging circuit connected between the output of said rectifier circuit and a battery; and a modem connected between said second inductive winding and a microprocessor for demodulating signals induced in said secondary winding, thereby providing demodulated signals comprising data for said microprocessor.

17. The apparatus of claim 16 wherein data signals output by said microprocessor are modulated by said modem, said modulated microprocessor data signals being input to said secondary inductive winding and inducing data signals in said primary winding, said apparatus further comprising a demodulator connected between said first inductive winding and said second electronic device for demodulating said signals induced in said primary winding for transfer to said second electronic device.

* * * * *